United States Patent

[11] 3,603,138

| [72] | Inventor | Erwin P. Peterson |
| | | Box 236, Blue Grass, Iowa 52726 |
| [21] | Appl. No. | 879,003 |
| [22] | Filed | Nov. 21, 1969 |
| [45] | Patented | Sept. 7, 1971 |

[54] PNEUMATIC TESTER FOR LINEMAN'S GLOVES
6 Claims, 3 Drawing Figs.

[52] U.S. Cl. ........................................................ 73/37
[51] Int. Cl. ........................................................ G01m 3/26, G01m 3/02
[50] Field of Search ............................................ 73/37, 38, 40, 40.5, 49.2, 49.8

[56] References Cited
UNITED STATES PATENTS

| 2,370,945 | 3/1945 | Fields ........................ | 73/37 |
| 3,258,117 | 6/1966 | Domeck, Jr. et al. ..... | 73/38 X |
| 3,386,281 | 6/1968 | Menge et al. .............. | 73/38 X |

FOREIGN PATENTS

| 795,052 | 9/1968 | Canada ....................... | 73/40 |

Primary Examiner—Louis R. Prince
Assistant Examiner—William A. Henry, II
Attorneys—Harry M. Saragovitz, Edward J. Kelly, Herbert Berl and Albert E. Arnold, Jr.

ABSTRACT: A testing apparatus is provided for lineman's elastic gloves which comprises a closed, U-shaped channel having at least one pneumatic sidewall for engaging the cuff of the glove with the opposite sidewall when it is inflated. The glove can then be inflated, as by air pressure, for inspection as to its porosity.

PATENTED SEP 7 1971 3,603,138
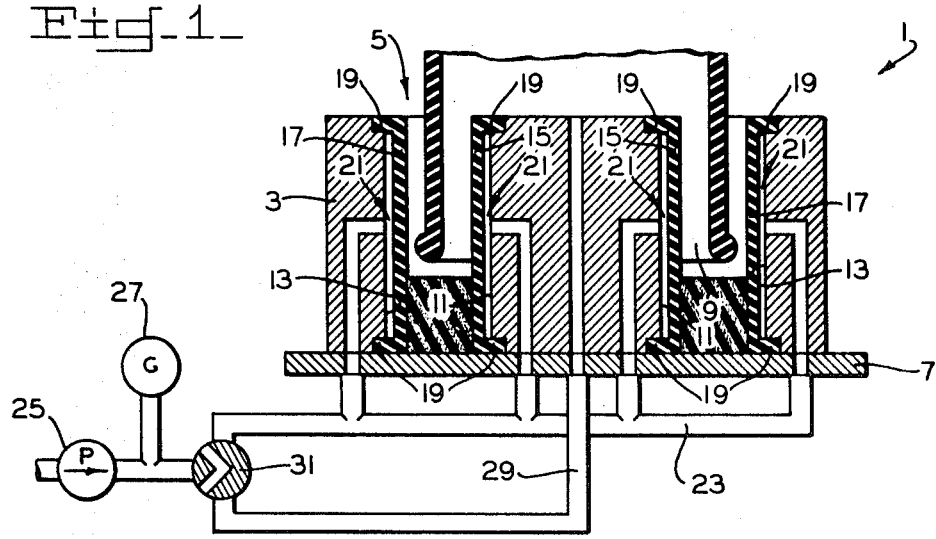
Fig_1_
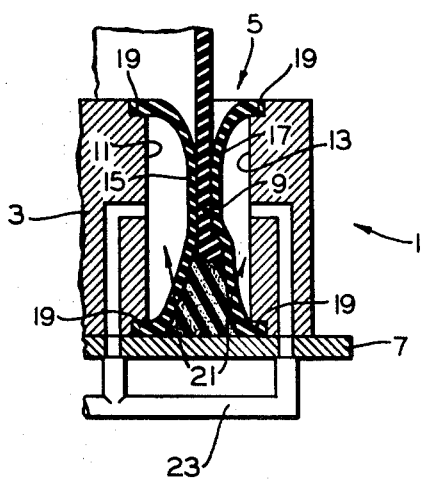
Fig_2_
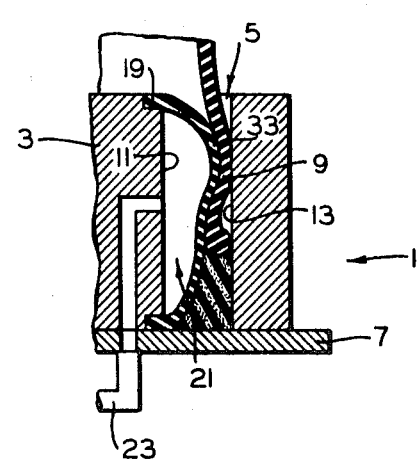
Fig_3_
INVENTOR
Erwin P. Peterson
BY
Harry M. Saragovitz, Edward J. Kelly,
Herbert Berl, & Gilbert E. Arnold.
ATTORNEYS

PNEUMATIC TESTER FOR LINEMAN'S GLOVES

The invention described herein may be manufactured, and used by or for the United States Government for Governmental purposes without the payment to me of any royalty thereon.

The present invention relates to an apparatus for testing lineman's gloves, and more particularly to a portable apparatus for examining the porosity of such gloves.

BACKGROUND OF THE INVENTION

Because of the elastic material from which lineman's gloves are fabricated, they are highly susceptible to puncture which destroys their insulating characteristics against conductivity of electricity, particularly high voltages.

The use of a glove made from elastic material, such as rubber, by lineman to insulate against electricity while the lineman is working on live wires, cables, or the like is well known. Gloves of this type are usually examined at a central location before being taken into the field for use. Because of their susceptibly to puncture and in order to provide for the safety of the lineman using such gloves, a portable apparatus is provided whereby such gloves can be examined in the field.

Therefore, it is a primary object of the present invention to provide a portable apparatus for examining lineman's gloves which is readily adaptable to field conditions and available facilities.

It is also an object of the present invention to provide a portable pneumatic apparatus for examining the porosity of lineman's gloves.

It is a further object of the present invention to provide a pneumatic tester for lineman's gloves which is relatively simple in structure, and highly efficient in use.

SUMMARY OF THE INVENTION

In accordance with the present invention, a pneumatic apparatus for testing lineman's gloves is provided which comprises a closed, U-shaped channel for receiving the cuff of a glove to be tested. At least one sidewall of the channel is provided with inflatable means to engage the glove cuff with the opposite sidewall. Means are provided to inflate the glove thereby to facilitate inspection for porosity.

BRIEF DESCRIPTION OF THE DRAWING

FIG. 1 is a central sectional view of a preferred embodiment of the present invention showing the cuff of a glove prior to engagement thereof;

FIG. 2 is a broken-away view of a portion of the channel shown in FIG. 1 but showing the cuff engaged by the inflated sidewalls of the channel; and FIG. 3 is a view similar to FIG. 2 of an alternate embodiment of the present invention.

DESCRIPTION OF THE PREFERRED EMBODIMENTS

Referring more particularly to the drawing, wherein similar reference characters have been used to designate corresponding parts throughout, there is shown a preferred embodiment of the present invention in FIGS. 1 and 2.

The pneumatic apparatus 1 of the preferred embodiment comprises a housing 3 which is designed to provide a closed U-shaped channel 5 disposed with the open side extending upwardly. The base 7 of the housing may be integral or separate therefrom according to choice. Preferably the U-shaped channel is made annular, either circular or oval, and is of a width sufficient to conveniently receive the cuff 9 of a glove disposed therein.

Opposite sidewalls 11, 13 or the U-shaped channel are provided with a flexible or pneumatic liner 15, 17 which has the peripheral edges 19 thereof secured to the housing thereby to define a sealed cavity 21 between each liner and its respective sidewall. The bottom portion of the U-shaped channel, below the midpoint thereof, is preferably filled with a relatively soft, spongelike, or flexible material, such as sponge rubber, to restrict and protect the glove cuff from becoming inserted into the channel below such material.

The sealed cavities 21 are connected to a fluid pressure source by conduit means 23, such as an air pump 25, thereby to expand the liners 15, 17 simultaneously under the influence of pressure. Control of pressure is regulated by means of a pressure gauge 27 and suitable control valves in a manner well known. Centrally located within the housing conduit means 29 are provided therethrough for introducing gas pressure to the interior of a glove retained by the pneumatic apparatus. The source of gas pressure may be common to inflating the cavities 11, 13 and the interior of the glove, and pressures selectively controlled through a diverter valve 31.

Although the pneumatic apparatus is preferably designed to utilize expandable liners on opposite sidewalls of the channel, such as those illustrated in FIGS. 1 and 2 of the drawing, the invention is susceptible of practice utilizing only one liner located on either the inside or outside wall of the channel, such as the liner 33 illustrated in FIG. 3 of the drawing. In either case, however, the function of the expandable liners is to engage the glove cuff and seal the interior of the glove from the ambient. This is accomplished by the liner urging the cuff toward the opposite sidewall or toward the liner carried by the opposite sidewall. By applying sufficient pressure to the liner, the glove cuff can be securely held to enable inflation of the glove. Once the glove is inflated, examination for porosity can be effected by observing reduction in pressure on the pressure gauge.

The pneumatic apparatus described herein is particularly suitable for field use since its construction is relatively simple and small, and, at the same time is adaptable for connection to customary air compressors carried by field crews.

It will be recognized by persons skilled in the art that modifications and embodiments other than the two embodiments described herein are possible. Therefore, it is to be understood that this application not be limited to the exact details of construction shown and described.

I claim:

1. An apparatus for testing lineman's gloves comprising means providing a closed U-shaped channel with the open side thereof extending upwardly, pneumatic means lining opposite sidewalls of said channel means, means for inflating said pneumatic means thereby to expand those portions of said pneumatic means lining respective walls of said channel toward each other, whereby the cuff of a glove disposed within said channel will be engaged to seal the interior of the glove from the ambient, and means for inflating the glove to an extend necessary to determine the porosity of the glove.

2. The invention as defined in claim 1 wherein said pneumatic-inflating means is connected to simultaneously inflate said pneumatic means disposed on opposite sides of said channel.

3. The invention as defined in claim 2 wherein said apparatus includes means for maintaining inflation of said pneumatic means during operation of said glove-inflating means.

4. The invention as defined in claim 3 wherein said maintaining means comprises a diverter valve.

5 The invention as defined in claim 1 wherein relatively soft, flexible means is disposed in the bottom of said channel.

6. An apparatus for testing lineman's gloves comprising means providing a U-shaped channel with the open side thereof adapted for receiving the cuff of said glove, pneumatic means, lining opposite sidewalls of said channel for engaging said glove cuff on opposite sides thereof, means for inflating those portions of said pneumatic means lining respective walls of said channel toward each other, and means for inflating said glove for examination of porosity thereof.